(12) United States Patent
Yashima et al.

(10) Patent No.: US 7,589,146 B2
(45) Date of Patent: Sep. 15, 2009

(54) LATEX COMPOSITION

(75) Inventors: Hiroyuki Yashima, Niigata (JP); Kenji Mochizuki, Niigata (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 621 days.

(21) Appl. No.: 10/509,945

(22) PCT Filed: Apr. 18, 2003

(86) PCT No.: PCT/JP03/04955

§ 371 (c)(1),
(2), (4) Date: Oct. 4, 2004

(87) PCT Pub. No.: WO03/089511

PCT Pub. Date: Oct. 30, 2003

(65) Prior Publication Data

US 2005/0182173 A1    Aug. 18, 2005

(30) Foreign Application Priority Data

Apr. 19, 2002  (JP) .............................. 2002-117205
Dec. 13, 2002  (JP) .............................. 2002-362074

(51) Int. Cl.
 *C08F 214/08*   (2006.01)
(52) U.S. Cl. ..................... 524/519; 524/501; 524/502; 524/515; 524/523; 524/524; 524/432

(58) Field of Classification Search ................ 524/501, 524/502, 515, 519, 523, 524, 432
See application file for complete search history.

(56) References Cited

U.S. PATENT DOCUMENTS 6,008,287 A * 12/1999 Shibata et al. .............. 524/510
6,054,527 A *  4/2000 Voss et al. .................. 524/834

FOREIGN PATENT DOCUMENTS

| | | |
|---|---|---|
| EP | 1 167 446 A1 | 1/2002 |
| JP | 54-152037 | 11/1979 |
| JP | 57-108174 | 7/1982 |
| JP | 07-033912 | 2/1995 |
| JP | 8-337765 | 12/1996 |
| JP | 2000-336300 | 12/2000 |
| JP | 2001-19923 | 1/2001 |
| JP | 2001-30400 | 2/2001 |
| WO | WO 00/35596 | 6/2000 |
| WO | 01 10968 | 2/2001 |

* cited by examiner

*Primary Examiner*—Edward J Cain
(74) *Attorney, Agent, or Firm*—Oblon, Spivak, McClelland, Maier & Neustadt, P.C.

(57) ABSTRACT

A water base adhesive and a latex composition being a base of water base primer are provided. The latex composition comprises 100 parts by mass of a polychloroprene latex and from 1 to 70 parts by mass of an EVA resin having a mass ratio of ethylene being at least 40%, as main components.

20 Claims, No Drawings

LATEX COMPOSITION

TECHNICAL FIELD

The present invention relates to a latex composition useful as an adhesive or a primer which is used for bonding components of furniture, bedclothes, automobile accessories, parts such as shoe soles or a shoe sockings of athletic shoes, walking shoes, sandals, etc., or parts required to have shock absorption, of packaging materials, wet suits, clothings, health appliances, etc.

BACKGROUND ART

Heretofore, a polychloroprene (hereinafter referred to as CR) solvent type adhesive was used for producing a laminate for a shoe sole, a shoe socking or the like of an athletic shoe, a walking shoe or the like.

However, the CR solvent type adhesive contains an organic solvent such as toluene, ethyl acetate or methyl ethyl ketone. The organic solvent evaporates at work area during coating operation of the adhesive, and such evaporation is undesirable for safety and health of workers and for the environment. That is why reduction of organic solvent has been desired.

As a latex composition which can be substituted for the CR solvent type adhesive, an ethylenically unsaturated carboxylic acid-modified polychloroprene latex obtained by polymerization in the presence of a water-soluble polymer, was available, (for example, JP-A-07-33912), but the adhesive strength and adhesive water resistance were inadequate.

It is an object of the present invention to provide a latex composition free from problems from the viewpoint of safety and health and from the viewpoint of environment, unlike the conventional CR solvent type adhesive, and having high adhesive strength and adhesive water resistance at a level equal to or higher than the conventional CR solvent type adhesive.

DISCLOSURE OF THE INVENTION

The present inventors have conducted studies to attain the above object, and as a result, have found a latex composition comprising a polychloroprene latex and an EVA resin emulsion as main components.

Namely, the present invention is characterized by the followings.

1. A latex composition characterized by comprising a polychloroprene latex and from 1 to 70 parts by mass, per 100 parts by mass of the polychloroprene latex, of an EVA resin emulsion having a mass ratio of ethylene being at least 40%, as main components.
2. A latex composition characterized by comprising a polychloroprene latex and from 0.5 to 50 parts by mass, as calculated as solid content per 100 parts by mass of the solid content of the polychloroprene latex, of an EVA resin emulsion having a mass ratio of ethylene being at least 40%, as main components.
3. The latex composition according to 1 or 2, wherein the polychloroprene latex is one prepared by polymerizing 100 parts by mass of chloroprene and from 0.1 to 10 parts by mass of an ethylenically unsaturated carboxylic acid in the presence of from 0.5 to 10 parts by mass of polyvinyl alcohol and then, adding a pH adjusting agent to adjust the pH of the latex to from 6 to 10.
4. The latex composition according to 1 or 2, wherein the polychloroprene latex contains an alkali salt of resin acid.
5. The latex composition according to any one of 1 to 4, which contains an adhesive resin.
6. The latex composition according to any one of 1 to 5, which contains a metal oxide.
7. The latex composition according to 6, wherein the metal oxide is zinc oxide.
8. A method for bonding a porous polymer material and a cloth which comprises using the latex composition as defined in any one of above 1 to 7 as an adhesive.
9. A laminate characterized in that it is formed by bonding a porous polymer material and a cloth by means of the latex composition as defined in any one of above 1 to 7.
10. A water base primer obtained by adjusting the solid content of the latex composition as defined in any one of above 1 to 7 in a range of at most 40 wt %.
11. A bonding method for bonding an adherend by means of the water base primer as defined in above 10.

MODE FOR CARRYING OUT THE INVENTION

Now, the present invention will be described in further detail.

The EVA resin of the present invention is a copolymer resin of ethylene/vinyl acetate and is preferably used in an emulsion state. A method to obtain the EVA resin emulsion is not particularly restricted. For example, after the EVA copolymer is dissolved in an organic solvent, hot water and an emulsifying agent are added and dispersed, whereupon the solvent is removed under reduced pressure to obtain a latex. The organic solvent is not particularly restricted. For example, one which is able to dissolve the EVA polymer such as toluene, xylene, n-hexane or cyclohexane may be mentioned.

As the emulsifying agent, as an anionic type, there are a carboxylic acid type and a sulfuric ester type. For example, an alkali metal salt of resin acid, an alkyl sulfonate, or a condensate of sodium naphthalenesulfonate with formaldehyde is mentioned. As a nonionic type, there are, for example, a water-soluble polymer type, an ether type, an ester type, an alkyl phenol type and a sorbitan ester type. For example, a polyvinyl alcohol, a polyoxyethylene monostearate, or a sorbitan monooleate may be mentioned.

The mass ratio of ethylene in the EVA resin is required to be at least 40%, more preferably at least 55%, in order to improve the adhesive water resistance.

The content of the EVA resin emulsion in the composition of the present invention is required to be from 1 to 70 parts by mass in wet state per 100 parts by mass in wet state of polychloroprene latex. More preferably, it is from 2 to 30 parts by mass. If it is less than 1 part by mass, the adhesive strength and water resistance of the laminate will be inadequate. If it exceeds 70 parts by mass, the adhesive strength will be low.

Further, the composition of the present invention is required to contain from 0.5 to 50 parts by mass, preferably from 1.0 to 20 parts by mass, most preferably from 1.5 to 10 parts by mass, of the EVA emulsion as solid content per 100 parts by mass of the polychloroprene latex as calculated as solid content.

The emulsifying agent which is used for the polychloroprene latex of the present invention is not particularly restricted. Various types of emulsifying agents or dispersing agents, of anionic type, nonionic type or cationic type may be used.

As the anionic type, there is, for example, a carboxylic acid type or a sulfuric ester type. As a specific example, an alkali metal salt of rein acid, a $C_{8\text{-}20}$ alkyl sulfonate, an alkylaryl sulfate or a condensate of sodium naphthalenesulfonate with formaldehyde, may be mentioned.

As the nonionic type, there is, for example, a water-soluble polymer type, an ether type, an ester type, a sorbitan ester type, a sorbitan ester ether type or an alkyl phenol type. As a specific example, polyvinyl alcohol, polyoxyethylene monostearate, polyoxyethylene dodecyl ether, polyoxyethylenebenzyl distyryl ether or sorbitan oleate may be mentioned.

As the cationic type, there is, for example, an aliphatic amine salt, an aliphatic quaternary amine salt, an aromatic quaternary amine salt or a heterocyclic quaternary amine salt. As a specific example, octadecyltrimethyl ammonium chloride, hexadecyltrimethyl ammonium chloride, dodecyltrimethyl ammonium chloride or dilauryldimethyl ammonium chloride may be mentioned.

The polychloroprene latex in the present invention is preferably one obtained by polymerization using a polyvinyl alcohol or an alkali metal salt of resin acid as the emulsifying agent.

The above mentioned polyvinyl alcohol is not particularly restricted, but is preferably one, of which the saponification degree is within a range from 60 to 90 mol %. More preferably, the saponification degree is from 75 to 90 mol %. Further, the degree of polymerization of the polyvinyl alcohol is preferably within a range of from 200 to 3000. More preferably, the degree of polymerization is from 200 to 700. If the polyvinyl alcohol is within this range, polymerization operation can be carried out stably, the obtained latex has excellent stability, and a stable latex can be obtained at a high concentration.

As the amount of addition of the polyvinyl alcohol in the present invention, it is preferably from 0.5 to 10 parts by mass per 100 parts by mass of chloroprene. It is more preferably from 2 to 5 parts by mass and most preferably from 3 to 4 parts by mass. If the amount of addition of the polyvinyl alcohol is less than 0.5 part by mass, the emulsifying power tends to be inadequate, and aggregates tend to form during polymerization. If it exceeds 10 parts by mass, the production may sometimes become difficult, since increase of the viscosity occurs during polymerization, whereby stirring will be hindered and epidemic heat will be developed.

Polychloroprene to form the polychloroprene latex to be incorporated in the composition of the present invention may be a copolymer with an ethylenically unsaturated carboxylic acid. As a specific example of the ethylenically unsaturated carboxylic acid, acrylic acid, methacrylic acid, crotonic acid, fumaric acid, maleic acid, citraconic acid or glutaconic acid may be mentioned. These may be employed alone or in combination of two or more of them. Further, in the present invention, it is preferred to employ acrylic acid or methacrylic acid, and it is particularly preferred to employ methacrylic acid.

The amount of use of the ethylenically unsaturated carboxylic acid is preferably from 0.1 to 10 parts by mass per 100 parts by mass of chloroprene. It is more preferably from 0.5 to 4 parts by mass and most preferably from 0.8 to less than 2 parts by mass. If the amount of addition of the ethylenically unsaturated carboxylic acid is less than 0.1 part by mass, the production will be difficult due to lack poor stability of the latex and the ordinary state adhesive strength will also be low. If the amount of addition of the ethylenically carboxylic acid exceeds 10 parts by mass, the adhesive water resistance will be remarkably low.

Further, the chloroprene polymer to be used in the present invention may contain, in addition to chloroprene and ethylenically saturated carboxylic acid, a small amount of other monomers which are copolymerizable therewith. Such monomers are also included in the present invention.

As the monomer copolymerizable with chloroprene in the present invention, for example, 2,3-dichloro-1,3-butadiene, 1-chloro-1,3-butadiene, butadiene, isoprene, styrene, acrylonitrile, an ester of acrylic acid or an ester of methacrylic acid may be mentioned. If necessary, two or more of them may be employed in combination.

As the alkali salt of resin acid to be used as the emulsifying agent in the present invention, sodium salt and/or potassium salt is preferably used. As the amount of use, a range of from 2 to 7 parts by mass is preferable per 100 parts by mass of chloroprene, or chloroprene and the monomer copolymerizable therewith. If it is less than 2 parts by mass, the storage stability of the polychloroprene latex will be poor. If it exceeds 7 parts by mass, the adhesive water resistance will be poor.

Further, in the polychloroprene latex of the present invention, the toluene-insoluble gel content is preferably within a range of from 1 to 70 mass %, more preferably within a range of from 3 to 60 mass %. If the gel content is less than 1 mass %, the ordinary state adhesive strength will be low. If the gel content exceeds 70 mass %, the initial adhesive strength and adhesive water resistance will be low.

It is possible to control the gel content of the polychloroprene latex by adjusting (1) the use and the amount of use of a chain transfer agent, (2) the polymerization temperature and (3) the final conversion of the monomer.

First, the chain transfer agent is not particularly limited as long as it is one commonly employed for the production of a polychloroprene. For example, a known chain transfer agent, such as a long chain alkyl mercaptan such as n-dodecyl mercaptan, n-octadecyl mercaptan or tert-dodecyl mercaptan, a dialkyl xanthogen disulfide such as diisopropyl xanthogen disulfide or diethyl xanthogen disulfide, or iodoform, may be used.

Next, the polymerization temperature is preferably within a range of from 0 to 55° C. from the viewpoint of control of the polymerization. Further, the polymerization temperature is particularly preferably within a range of from 8 to 50° C. to carry out the polymerization reaction more smoothly.

Further, the final conversion of the monomer is preferably at least 70 mass % and more preferably at least 80 mass %.

In the present invention, the polychloroprene latex can be adjusted to a required concentration by concentration or dilution with water. However, its solid content concentration is preferably within a range of from 40 to 65 mass %, more preferably from 43 to 58 mass %. The higher the solid content concentration, the faster the drying speed, and the better the initial adhesive strength of the latex. Further, the solid content concentration may be adjusted by adjusting the ratio of the monomers at the time of polymerization, but it may be adjusted by concentration after the polymerization.

A pH adjusting agent in the present invention is used for adjusting the pH of the chloroprene polymer latex just after polymerization. For example, one or more may optionally be selected for use from strong basic substances such as sodium hydroxide, potassium hydroxide, diethanolamine and triethanolamine and salts showing basicity such as sodium carbonate, potassium carbonate, trisodium phosphate, disodium hydrogen phosphate, tripotassium citrate, dipotassium hydrogen citrate, sodium acetate, potassium acetate and sodium tetraborate.

A method for adding the pH adjusting agent in the present invention is not particularly restricted. A powder of the pH adjusting agent may be directly added or added after dilution with water to an optional ratio. The adjusting range of pH is preferably from 6 to 10.

As a catalyst which is used for the polymerization of polychloroprene in the present invention, an inorganic peroxide such as potassium persulfate, or an organic peroxide such as a ketone peroxide, a peroxyketanol, a hydroperoxide, a dialkyl peroxide or a diaryl peroxide may be mentioned.

It is preferred to use potassium persulfate as the catalyst in order to carry out stable polymerization. Further, potassium persulfate is preferably used in the form of an aqueous solution of from 0.1 to 5 mass %.

In order to improve the activity of the catalyst which is used for polymerization of the chloroprene latex in the present invention, it is possible to add e.g. sodium sulfite, potassium sulfite, ferrous sulfate, sodium anthraquinone β-sulfonate, formamidine sulfonic acid or L-ascorbic acid.

For the purpose controlling or terminating the polymerization reaction of the polychloroprene latex in the present invention, it is possible to use a polymerization inhibitor. As the polymerization inhibitor in the present invention, thiodiphenylamine, diethylhydroxylamine, hydroquinone, p-t-butyl catechol, 1,3,5-trihydoxybenzene or hydroquinone methyl ether may, for example, be mentioned.

For the purpose of preventing color change, etc., it is possible to add an oxidation inhibitor to the polychloroprene latex in the present invention. For example, 2,6-di-t-butyl-4-methylphenol, 2,2-methylenebis(6-t-4-methylphenol), 4,4-buthylenebis(6-t-butyl-3-methylphenol), ethylenebis(oxyethylene)bis[3-(5-t-butyl-4-hydroxy-m-tolyl)propionate], octadecyl-3-(3,5-di-t-butyl-4-hydroxyphenyl)propionate, or pentaerythritol-tetrakis[3-(3,5-di-t-butyl-4-hydroxyphenyl)propionate] may be mentioned.

For the purpose of improving the initial adhesive strength, it is possible to add an adhesive resin to the latex composition of the present invention. As the adhesive resin, a resin acid ester resin, a terpenephenol resin, a cumarone-indene resin, an aliphatic hydrocarbon resin or an aromatic resin may, for example, be mentioned. Especially an emulsion of a terpenephenol resin or a resin acid ester resin is preferred in order to have the initial adhesive strength and adhesive water resistance of the adhesive composition developed.

The amount of the adhesive resin to be added is preferably from 20 to 150 parts by mass, more preferably from 30 to 100 parts by mass, in wet state per 100 parts by mass in wet state of the polychloroprene latex. If it is either less than 20 parts by mass or more than 150 parts by mass, the adhesive strength will be improper.

It is possible to add a metal oxide to the latex composition of the present invention to improve the adhesive water resistance. As such a metal oxide, zinc oxide, titanium oxide, zirconium oxide, aluminum oxide, boron oxide, tin oxide, magnesium oxide and/or vanadium oxide may, for example, be mentioned. Zinc oxide, titanium oxide, aluminum oxide and/or zirconium oxide is preferred to improve the water resistance of the adhesive composition, and particularly preferred is zinc oxide.

The amount of the metal oxide to be added is preferably from 0.2 to 8.0 parts by mass, particularly preferably from 0.5 to 6.0 parts by mass, per 100 parts by mass of the solid content of the polychloroprene latex. If it is less than 2.0 parts by mass, the effect for imparting water resistance will be low. Further, if it exceeds 8.0 parts by mass, the adhesive strength will be poor.

The latex composition of the present invention may optionally contain, as the case requires, a curing accelerator such as an isocyanate or ethylenetiourea, an inorganic compound such as calcium carbonate, silica, sodium silicate, talc or clay, a plasticizer-softening agent such as dibutyl phthalate or process oil, a thickener such as sodium polyacrylate, water soluble polyurethane or methyl cellulose, a surfactant such as a polyoxyalkylene alkyl ether, a 1:2 mol type aliphatic alkanol amide, a 1:1 mol type diethanol amide or polyoxyethylene stearate, a film-forming assistant such as propylene glycol n-butyl ether, dipropylene glycol n-butyl ether or tripropylene glycol n-butyl ether, a water-dispersible type polymer of polyethylene imine or polyethylene oxide type, an antiseptic such as 1,2 benzothiazoline, a dye, an age resister, a thickener, an ultraviolet absorbert such as 2(2'-hydroxy-3'-t-butyl-5'-methylphenyl)-5-chlorobenzotriazole.

The solid content concentration of the water base primer of the present invention is required to be at most 40 mass % and preferably within a range from 10 to 30 mass %. In either case of a low solid content concentration of less than 10 mass % or a high solid content concentration exceeding 30 mass %, it will be difficult to control the thickness of the primer layer within the optimum range after drying. Accordingly, it is preferably within the a range from 10 to 30 mass % from the practical standpoint.

It is possible to adjust to the viscosity to desired level by adding a thickener to the water base primer. As a specific example of the thickener, polyvinyl alcohol (PVA), sodium polyacrylate, a water soluble polyurethane, an associated polyurethane emulsion, an alkali-swelling type acrylic emulsion, carboxymethyl cellulose (CMC), methyl cellulose (MC), hydroxyethylcellulose (HEC), hydroxypropyl cellulose (HPC), polyvinyl alcohol or a synthetic smectite may be mentioned.

A suitable amount of the thickener is from 0.03 to 15 parts by mass (as calculated as solid content ) per 100 parts by mass in wet state of the polychloroprene latex. If the amount is within this range, it is possible to prevent cissing of the primer on the surface of an elastomeric material.

The viscosity of the primer may be adjusted to the specification of the coating method and the coating equipment. However, it is preferably from 10 to 15000 [mPa·s] (B type viscometer, 25° C., 30 rpm). If the viscosity is less than 10 [mPa·s], cissing on an elastomeric material may sometimes be a problem. If the viscosity is higher than 15000 [mPa·s], uniform coating may sometimes be difficult.

The latex composition and water base primer of the present invention are produced by mixing the polychloroprene latex, an EVA resin and other additives. The mixing apparatus is not particularly restricted and a known apparatus such as a three-one motor, a homogenizer, a media mill and a colloid mill may be used. A coating method of the latex composition or the water type primer of the present invention is not particularly restricted. However, the coating may be preferably carried out on a porous organic material side. A method of coating the latex composition on a porous organic material is preferably automated machine coating, whereby uniform coating is possible, but it is not particularly restricted. Usually, a method such as brush coating, pallet coating, spray coating, roll coater coating or bar coater coating is possible.

The laminate of the present invention is obtained by coating the latex composition on a porous polymer material, further laminating a cloth thereon, followed by pressing by means of a pressing machine. Such a bonding method and a laminating method are not particularly restricted. It is possible to introduce a preliminary drying step after coating the latex composition on a porous organic material and before laminating a cloth (hereinafter the bonding method which includes the preliminary drying will be referred to as dry bonding and the bonding method which includes no preliminary drying method will be referred to as wet bonding). Either bonding method of dry bonding or wet bonding may be employed for the laminate. When the initial strength and ordinary state strength are important, the dry bonding method is preferred. Whereas., when the adhesive water resistance is important, the wet bonding method is preferred.

In a case where the preliminary drying is carried out, the temperature is preferably from 50 to 80° C., more preferably from 60 to 80° C. If it is higher than 80° C., the porous polymer material may thermally be deformed before the pressing step. Further, it is possible to carry out press bonding by means of a pressing machine after coating of adhesive and gluing together followed by drying from 100 to 140° C.

The pressing method may be a hot press or a cold press. The hot press is carried out preferably from 100 to 170° C. In the case of the cold press, a step of preliminarily heating the porous organic material having a cloth put thereon to from 100 to 130° C. is required before pressing. The pressure in the pressing step is not particularly restricted and may be set depending on the particular purpose or application. However, it is preferably from 0.03 to 10 MPa, more preferably from 0.05 to 5 MPa, in order to secure adequate adhesive strength without destroying the porous organic material of the laminate. In the pressing step, shaping may be carried out by, depending upon the particular purpose or application, a method of amplifying pressure while a sheet is in a softened state, for example, by a bleed drawing method, a match mold method, a plug and ring method, a slip forming method (reducing mold method), a vacuum molding method or a compression molding method.

The cloth to be used in the present invention is a woven fabric, a knitted fabric or a non-woven fabric, and its fiber material, tissue, yarn count, (T+W) density (T is warp and W is weft), thickness and the method for its production are not restricted and may be suitably selected depending upon particular purpose or application and in consideration of the texture or color. As the woven fabric, for example, a spun woven fabric and a filament woven fabric may be mentioned. As the fiber material, cotton, silk, rayon, cupro, acetate, triacetate, nylon, polyester, acryl or promix may, for example, be mentioned. The knitted fabric may also be called stockinet, knit or jersey cloth, and as its fiber material, cotton, silk, rayon, cupro, acetate, triacetate, nylon, polyester, acryl or promix may, for example be mentioned. As the non-woven fabric, wet type non-woven fabric, chemical bond non-woven fabric, thermal bond non-woven fabric, air-laid non-woven fabric, spun lace non-woven fabric, spun bond non-woven fabric, melt blown non-woven fabric, needle punched non-woven fabric or stitch bond non-woven fabric may be mentioned. As its fiber material, cotton, rayon, polyester, polypropylene, nylon, acryl, vinylon, glass fiber, pulp or carbon fiber may, for example be mentioned.

The porous polymer material in the present invention is a foamed plastic or a foamed rubber (foam rubber). The foaming method and the material or thickness of the foam are not particularly restricted and may suitably be selected depending upon particular purpose or application and in consideration of the flexibility or strength of the material. As the foaming method, for example, melt foaming, solid phase foaming or cast foaming may be mentioned. As a specific example of melt foaming, chemical cross-linkage foaming, electron cross-linkage foaming, extrusion foaming, one step pressurizing foaming or two steps pressurizing foaming may be mentioned. As a specific example of the solid phase foaming, a beads method may, for example, be mentioned. As the cast foaming, molding foaming, block foaming (slab foaming), continuous laminate foaming, injection foaming or spray foaming may, for example, be mentioned. Further, as the material, a flexible foamed urethane, (hereinafter referred to as flexible foamed PUR), foamed polypropylene (hereinafter referred to as foamed PP), foamed polyethylene (hereinafter referred to as foamed PE), foamed ethylene vinyl acetate copolymer (hereinafter referred to as foamed EVA), foamed polyvinyl chloride (hereinafter referred to as foamed PVC) or foamed polychloroprene (hereinafter referred to as foamed CR) may, for example, be mentioned. Especially, flexible foamed PUR, foamed PP and foamed EVA, which are excellent in processability by thermoforming are preferred. Particularly, foamed PP, of which the density before press bonding is from 10 to 80 Kg/m$^3$, and foamed EVA, of which the density before press bonding is from 70 to 120 Kg/m$^3$, are more preferred. Within this range of density, adhesion can be made more strong. Among these, foamed EVA is particularly preferred since it is easy to mold as well as it is possible to present strong adhesion.

The density mentioned here is mass per unit volume of a substance at 23° C. It is obtained by measuring the size of a rectangular parallel piped material with a micrometer caliper to obtain its volume and measuring mass with a weighing machine.

The thickness of the porous organic material is not particularly restricted and may be selected depending upon the particular purpose or application. For example, in an application to shoe sockings for athletic shoes, it is preferably less than 10 mm. Further, these porous polymer materials may be ones which are obtained by laminating another sheet on these sheets as long as the bond surface is the above mentioned porous polymer material.

The water base primer in the present invention can be applied also to various organic materials, in addition to the above mentioned porous polymer material. Specifically, a vulcanized rubber such as butadiene rubber (BR), chloroprene rubber (CR), natural rubber (NR), isoprene rubber (IR), styrene-butadiene rubber (SBR), butyl rubber (IIR), norbornene rubber (NOR), nitrile rubber (NBR), hydrogenated nitrile rubber (HNBR), brominated butyl rubber (BIIR), chlorinated butyl rubber (CIIR), acryl nitrile-isoprene copolymer (NIR), ethylene-propylene-diene rubber (EPDM), an ethylene-butadiene-styrene. block copolymer (SBS), a thermoplastic elastomer of e.g. polyester type, polyurethane type or polyolefin type, a polyvinyl chloride resin (PVC), an ethylene-vinyl acetate copolymer (EVA), 1,2-polybutadiene (RB), a polyolefin resin or a styrene resin, and an acrylonitrile-butadiene-styrene copolymer (ABS) may, for example, be mentioned. However, such organic materials are not particularly restricted.

EXAMPLES

Now, the present invention will be described with reference to Examples, but the present invention is by no means restricted by these Examples. Further, in the following Examples, "parts" and "%" are based on mass unless otherwise specified.

EXPERIMENT 1

Production of Polychloroprene Latex

Using a reactor having an internal capacity of 30 litters, under nitrogen stream, 94 parts by mass of water and 3.5 parts by mass of polyvinyl alcohol (DENKA POVAL B-05, manufactured by Denki Kagaku Kogyo K.K., saponification degree: 88 mol %, polymerization degree: 550) were put, heated (60° C.) and dissolved. After cooling this aqueous solution to near room temperature, 99 parts by mass of a chloroprene monomer, 1.0 part by mass of methacrylic acid and 0.3 part by mass of octyl mercaptan were added thereto. While maintaining it at 45° C., the solution was polymerized by using sodium sulfite and potassium persulfate as initiators to obtain a polychloroprene latex. The final rate of polymerization was 99.5%.

Then, to this polychloroprene latex, a 10% sodium carbonate solution was added to adjust the pH to 8.0, and then, 3 parts of a 20% aqueous solution of a fatty acid alkanol amide (manufactured by Diamond Shamrock Chemical) and 0.5 part by mass of an anti-oxidant (SELOSOLH633, manufactured by CHUKYO YUSHI. CO., LTD) were added to obtain polychloroprene latex (I) having its solid content adjusted to 47%.

Then, the following measurements were carried out with respect to this polychloroprene latex (I).

Measurement of Gel Content

A sample of the polychloroprene latex was freeze-dried and accurately weighed. The weight will be referred to as A. After dissolving it in toluene (adjusted to 0.6%), using a centrifuge and further using a wire mesh of 200 mesh, a gel was separated. The gel content was air-dried, in an atmosphere of 110° C. for one hour and accurately weighed. The weight will be referred to as B.

The gel content was calculated by the following formula.

Gel content=$B/A \times 100$(%)

The gel content of the polychloroprene latex (I) was 38%.

EXAMPLE 1

Production of Latex Composition

100 Parts by mass in wet state of the polychloroprene latex (I), 70 parts by mass in wet state of a terpene phenol resin (TAMANOL E-100, manufactured by ARAKAWA CHEMICAL INDUSTRIES, LTD., solid content: 53%), 10 parts by mass in wet state of an EVA resin (EV-2, manufactured by CHUKYO YUSHI. CO., LTD, ethylene/vinyl acetate mass ratio: 72/28, the solid content: 32%) and 1 part by mass in wet state of zinc oxide (AZ-SW, manufactured by OSAKI INDUSTRY CO., LTD., the solid content: 50%) were stirred and mixed by a three-one motor to obtain a latex composition A.

Then, the latex composition A was coated on a foamed EVA sheet (2A-1064, manufactured by MITSUFUKU INDUSTRY CO., LTD., thickness: 5 mm) by a brush. The amount of the latex composition A coated was 60 g (in wet state)/m$^2$. A polyester woven fabric was overlaid on the foamed EVA sheet coated with the latex composition A and press bonded under a pressure of 1 MPa by a pressing machine heated to 120° C. to obtain a laminate a. This step of from coating to bonding will be referred to as the adhesive method (1).

The laminate was evaluated by the following methods.

Initial Adhesive Strength

After 10 minutes from press bonding, the peeling strength at 180° was measured at a speed of 200 mm/min by a tensile tester.

Normal Adhesive Strength

After 5 days from press bonding, the peeling strength at 180° was measured at a speed of 200 mm/min by a tensile tester.

Adhesive Water Resistance

After 5 days from press bonding, the laminate was immersed in pure water at 23° C. for 2 days. Then, the peeling strength at 180° was measured at a speed of 200 mm/min by a tensile tester.

EXAMPLE 2

100 Parts by mass in wet state of the polychloroprene latex (I) obtained in Experiment 1, 70 parts by mass in wet state of a resin acid ester resin (SK-90D, manufactured by HARIMA CHEMICALS, INC., solid content: 50%), 6 parts by mass in wet state of an EVA resin (EV-2, manufactured by CHUKYO YUSHI. CO., LTD, ethylene/vinyl acetate mass ratio: 72/28, solid content: 32%) and 1 part by mass in wet state of zinc oxide (AZ-SW, manufactured by OSAKI INDUSTRY CO., LTD., solid content: 50%) were stirred by a three-one motor to produce a latex composition B. The latex composition B was coated on a foamed EVA sheet (2A-1064, manufactured by MITSUFUKU INDUSTRY CO., LTD., thickness: 5 mm) by a brush and bonded by the adhesive method (1) to obtain a laminate b.

EXAMPLE 3

The latex composition A obtained in Experiment 1 was coated on a foamed EVA sheet (2A-1064, manufactured by MITSUFUKU INDUSTRY CO., LTD., thickness: 5 mm) by a brush. The amount of the latex composition A coated was 60 g in wet state/m$^2$. The coated EVA sheet was dried at 70° C. for 1 minute to form an adhesive larger, and a polyester woven fabric was overlaid thereon and press-bonded under a pressure of 1 MPa by a pressing machine at 120° C. to obtain a laminate c. This step of from coating to bonding will be referred to as the adhesive method (2).

EXPERIMENT 2

Using a reactor having an internal capacity of 3 litters, in a nitrogen stream, 100 parts of water, 5 parts of disproportionated resin acid, 0.6 part of sodium hydroxide, 0.7 part of potassium hydroxide, 0.3 part of a sodium salt of a formaldehyde/naphthalene sulfonic acid condensate, 0.3 part of sodium hydrogen sulfite were charged. After dissolving them, 100 parts of a chloroprene monomer and 0.14 part of n-dodecyl mercaptan were added with stirring. Using potassium persulfate as an initiator, in a nitrogen atmosphere, polymerization was carried out at 10° C. When the polymerization rate reached 90%, an emulsion of phenothiazine was added to terminate the polymerization. An unreacted monomer was removed under reduced pressure to obtain a polychloroprene latex. Further, the polychloroprene latex was concentrated by evaporating water under reduced pressure and adjusted so that its solid content became 60 mass %, to obtain a polychloroprene latex (II). This gel content was 10%.

EXAMPLE 4

100 Parts by mass in wet state of the polychloroprene latex (II), 70 parts by mass in wet state of a terpene phenol resin (TAMANOL E-100, manufactured by ARAKAWA CHEMICAL INDUSTRIES, LTD., solid content: 53%), 10 parts by mass in wet state of an EVA resin emulsion (EV-2, manufactured by CHUKYO YUSHI. CO., LTD, ethylene/vinyl acetate mass ratio: 72/28, solid content: 32%) and 1 part by mass in wet state of zinc oxide (AZ-SW, manufactured by OSAKI INDUSTRY CO., LTD., solid content: 50%) were stirred and mixed by a three-one motor to obtain a latex composition C.

The latex composition C was coated on a foamed EVA sheet (2A-1064, manufactured by MITSUFUKU INDUSTRY CO., LTD., thickness: 5 mm) by a brush and bonded by the adhesive method (1) to obtain a laminate d.

EXAMPLE 5

100 Parts by mass in wet state of the polychloroprene latex (I) obtained in Experiment 1, 70 parts by mass in wet state of a terpene phenol resin (TAMANOL E-100, manufactured by ARAKAWA CHEMICAL INDUSTRIES, LTD., solid content: 53%), 10 parts by mass in wet state of an EVA resin emulsion (EV-6, manufactured by CHUKYO YUSHI. CO., LTD, ethylene/vinyl acetate mass ratio: 81/19, solid content: 32%) and 1 part by mass in wet state of zinc oxide (AZ-SW, manufactured by OSAKI INDUSTRY CO., LTD., solid content: 50%) were stirred by a three-one motor to obtain a latex composition D.

The latex composition D was coated on a foamed EVA sheet (2A-1064, manufactured by MITSUFUKU INDUSTRY CO., LTD., thickness: 5 mm) by a brush and bonded by the adhesive method (1) to obtain a laminate e.

COMPARATIVE EXAMPLE 1

100 Parts by mass in wet state of the polychloroprene latex (I) obtained in Experiment 1, 70 parts by mass in wet state of a terpene phenol resin (TAMANOL E-100, manufactured by ARAKAWA CHEMICAL INDUSTRIES, LTD., solid content: 53%) and 1 part by mass in wet state of zinc oxide (AZ-SW, manufactured by OSAKI INDUSTRY CO., LTD., solid content: 50%) were stirred and mixed by a three-one motor to obtain a latex composition E.

The latex composition E was coated on a foamed EVA sheet (2A-1064, manufactured by MITSUFUKU INDUSTRY CO., LTD., thickness: 5 mm) by a brush and bonded by the adhesive method (1) to obtain a laminate f.

COMPARATIVE EXAMPLE 2

100 Parts by mass in wet state of the polychloroprene latex (I) obtained in Experiment 1, 70 parts by mass in wet state of a resin ester resin (SK-90D, manufactured by HARIMA CHEMICALS, INC., solid content: 50%) and 1 part by mass in wet state of zinc oxide (AZ-SW, manufactured by OSAKI INDUSTRY CO., LTD., solid content: 50%) were stirred and mixed by a three-one motor to produce a latex composition F.

The latex composition F was coated on a foamed EVA sheet (2A-1064, manufactured by MITSUFUKU INDUSTRY CO., LTD., thickness: 5 mm) by a brush and bonded by the adhesive method (1) to obtain a laminate g.

COMPARATIVE EXAMPLE 3

The latex composition E obtained in Comparative Example 1 was coated on a foamed EVA sheet (2A-1064, manufactured by MITSUFUKU INDUSTRY CO., LTD., thickness: 5 mm) by a brush and bonded by the adhesive method (2) to obtain a laminate h.

COMPARATIVE EXAMPLE 4

100 Parts by mass in wet state of the polychloroprene latex (II) obtained in Experiment 2, 70 parts by mass in wet state of a terpene phenol resin (TAMANOL E-100, manufactured by ARAKAWA CHEMICAL INDUSTRIES, LTD., solid content: 53%) and 1 part by mass in wet state of zinc oxide (AZ-SW, manufactured by OSAKI INDUSTRY CO., LTD., solid content: 50%) were stirred and mixed by a three-one motor to produce a latex composition G.

The latex composition G was coated on a foamed EVA sheet (2A-1064, manufactured by MITSUFUKU INDUSTRY CO., LTD., thickness: 5 mm) by a brush and bonded by the adhesive method (1) to obtain a laminate i.

COMPARATIVE EXAMPLE 5

100 Parts by mass in wet state of the polychloroprene latex (I) obtained in Experiment 1, 70 parts by mass in wet state of a terpene phenol resin (TAMANOL E-100, manufactured by ARAKAWA CHEMICAL INDUSTRIES, LTD., solid content: 53%), 6 parts by mass in wet state of an EVA resin emulsion (EVA-59, manufactured by Denki Kagaku Kogyo K.K., ethylene/vinyl acetate mass ratio: 27/73, solid content: 56%) and 1 part by mass in wet state of zinc oxide (AZ-SW, manufactured by OSAKI INDUSTRY CO., LTD., solid content: 50%) were stirred and mixed by a three-one motor to obtain a latex composition H.

The latex composition H was coated on a foamed EVA sheet (2A-1064, manufactured by MITSUFUKU INDUSTRY CO., LTD., thickness: 5 mm) by a brush and bonded by the adhesive method (1) to obtain a laminate j.

Further, in some Examples, the results could not be identified with numerical values because materials were broken at a time of measurement due to high adhesive strength.

TABLE 1

|  | EXAMPLE 1 | EXAMPLE 2 | EXAMPLE 3 | EXAMPLE 4 | EXAMPLE 5 |
|---|---|---|---|---|---|
| | | | | Unit for the amounts: parts by mass | |
| Name of latex composition | A | B | A | C | D |
| Polychloroprene latex (I) | 100 | 100 | 0 | 0 | 100 |
| Polychloroprene latex (II) | 0 | 0 | 0 | 100 | 0 |
| TAMANOL E-100 | 70 | 0 | 70 | 70 | 70 |
| SK-90D | 0 | 70 | 0 | 0 | 0 |
| EV-2 | 10 | 6 | 10 | 10 | 0 |
| EV-6 | 0 | 0 | 0 | 0 | 10 |
| AZ-SW | 1 | 1 | 1 | 1 | 1 |
| Adhesive method | Adhesive method 1 | Adhesive method 1 | Adhesive method 2 | Adhesive method 1 | Adhesive method 1 |

TABLE 1-continued

Unit for the amounts: parts by mass

|  | EXAMPLE 1 | EXAMPLE 2 | EXAMPLE 3 | EXAMPLE 4 | EXAMPLE 5 |
|---|---|---|---|---|---|
| Name of laminate | Laminate a | Laminate b | Laminate c | Laminate d | Laminate e |
| Adhesive strength (N/mm) | | | | | |
| Initial adhesive strength | Material broken | Material broken | Material broken | Material broken | Material broken |
| Normal adhesive strength | Material broken | Material broken | Material broken | Material broken | Material broken |
| Adhesive water resistance | Material broken | Material broken | 0.9 | Material broken | Material broken |

TABLE 2

Unit for the amounts: parts by mass

|  | EXAMPLE 1 | EXAMPLE 2 | EXAMPLE 3 | EXAMPLE 4 | EXAMPLE 5 |
|---|---|---|---|---|---|
| Name of latex composition | E | F | E | G | H |
| Polychloroprene latex (I) | 100 | 100 | 100 | 0 | 100 |
| Polychloroprene latex (II) | 0 | 0 | 0 | 100 | 0 |
| TAMANOL E-100 | 70 | 0 | 70 | 70 | 70 |
| SK-90D | 0 | 70 | 0 | 0 | 0 |
| EV-2 | 0 | 0 | 0 | 0 | 0 |
| EV-6 | 0 | 0 | 0 | 0 | 6 |
| AZ-SW | 1 | 1 | 1 | 1 | 1 |
| Adhesive method | Adhesive method 1 | Adhesive method 1 | Adhesive method 2 | Adhesive method 1 | Adhesive method 1 |
| Name of laminate | Laminate f | Laminate g | Laminate h | Laminate I | Laminate j |
| Adhesive strength (N/mm) | | | | | |
| Initial adhesive strength | 0.7 | 0.8 | Material broken | 0.8 | 0.8 |
| Normal adhesive strength | 0.8 | 0.9 | Material broken | 0.7 | 0.9 |
| Adhesive water resistance | 0.3 | 0.3 | 0.2 | 0.3 | 0.6 |

EXAMPLE 6

Using the polychloroprene latex (II) obtained in Experiment 2, to 100 parts by mass in wet state of the chloroprene latex, 5 parts by mass in wet state of an EVA resin emulsion (EV-2, manufactured by CHUKYO YUSHI. CO., LTD, solid content: 32%) was added and 50 parts by mass in wet state of a terpene phenol resin emulsion (TAMANOL E-100, manufactured by ARAKAWA CHEMICAL INDUSTRIES, LTD., solid content: 53%) was added as an adhesive resin. Further, by adding pure water, the solid content in the entire blend was adjusted to 20% to obtain a water base primer.

Further, to 100 parts by mass in wet state of the polychloroprene latex, 50 parts by mass in wet state of a terpene phenol resin emulsion (TAMANOL E-100, manufactured by ARAKAWA CHEMICAL INDUSTRIES, LTD., solid content: 53%) as an adhesive resin, 2.0 part in wet state of a sodium polyacrylate-based thickener (ARON A-20L, manufactured by TOAGOSEI CO., LTD., solid content: 17%), 10 parts by mass of aluminum hydroxide powder (HIGILITE H-42M, manufactured by SHOWA DENKO K.K.) as a metal oxide, 2 parts in wet state of zinc oxide (AZ-SW, manufactured by OSAKI INDUSTRY CO., LTD., solid content: 50%), and a water disperse type isocyanate compound (Takenate WD-730, manufactured by Mitsui Takeda Chemicals, Inc) as a curing agent, were added to obtain a water base adhesive.

90 g (wet)/m² of the above mentioned water base primer was coated on the surface of the bonding side of an EVA resin sponge (foamed EVA, size: 20 mm in width×70 mm in length) as one adherend and dried for 5 minutes in an atmosphere of 60° C. After a buff treatment (surface polishing) of the bond surface of a vulcanized styrene-butadiene rubber (vulcanized SBR, size: 20 mm in width×70 mm in length) as the other adherend, the surface was wiped lightly by a gauze impregnated with water base primer and dried for 5 minutes in an atmosphere of 60° C. 150 g (wet)/m² of the above mentioned water base adhesive was coated on both adherends by a brush. After dried for 5 minutes in an atmosphere of 60° C., both adherends were put together and press-bonded by a hand roller. The following evaluations were carried out with respect to the test specimens obtained by this method.

Test for Evaluating Initial Adhesive Strength

After 10 minutes from press bonding, the T-type peeling strength was measured at a tensile speed of 200 mm/min by a tensile tester.

Test for Evaluating Normal Adhesive Strength

After 5 days from press bonding, the T-type peeling strength was measured at a tensile speed of 200 mm/min by a tensile tester.

Adhesive Water Resistance

After 5 days from press bonding, the test specimen was immersed in pure water at 23° C. for 2 days. Then, the 180° peeling strength was measured at a speed of 200 mm/min by a tensile tester.

EXAMPLE 7

The test was carried out in the same manner as Example 6, except for using EV-6 as an EVA resin emulsion.

COMPARATIVE EXAMPLE 6

The test was carried out in the same manner as Example 6, except for not using an EVA resin emulsion.

TABLE 3

|  | Unit for the amounts: parts by mass | | |
|---|---|---|---|
|  | EXAMPLE 6 | EXAMPLE 7 | EXAMPLE 8 |
| Primer treatment Chloroprene latex (II) | 100 | 100 | 100 |
| EV-2 | 5 | 0 | 0 |
| EV-6 | 0 | 5 | 0 |
| TAMANOL E-100 | 50 | 50 | 50 |
| Pure water | Optimum amount | Optimum amount | Optimum amount |
| Primer solid content [%] | 20 | 20 | 20 |
| Adhesive strength [N/mm] | | | |
| Initial adhesive strength | 4.6 | 4.5 | 0.6 |
| Normal adhesive strength | 5.3 | 5.3 | 1 |
| Adhesive water resistance | 3.9 | 4.2 | 0.7 |

INDUSTRIAL APPLICABILITY

Tables 1 to 3 clearly show that the latex composition of the present invention and the water base primer based thereon are excellent in the initial adhesive strength, normal adhesive strength and adhesive water resistance, and thus are useful to bond materials required to have shock absorption such as furniture, bedclothes, automobile accessories, parts for shoes and wet suits.

The invention claimed is:

1. A latex composition comprising a polychloroprene latex and from 1 to 70 parts by mass, per 100 parts by mass of the polychloroprene latex, of an EVA resin emulsion, the EVA resin having an ethylene/vinyl acetate mass ratio of at least 55/45, as main components.

2. A latex composition comprising a polychloroprene latex and from 0.5 to 50 parts by mass, as calculated as solid content per 100 parts by mass of the solid content of the polychloroprene latex, of an EVA resin emulsion, the EVA resin having an ethylene/vinyl acetate mass ratio of at least 55/45, as main components.

3. The latex composition according to claim 1, wherein the polychloroprene latex is one prepared by polymerizing 100 parts by mass of chloroprene and from 0.1 to 10 parts by mass of an ethylenically unsaturated carboxylic acid in the presence of from 0.5 to 10 parts by mass of polyvinyl alcohol and then, adding a pH adjusting agent to adjust the pH of the latex to from 6 to 10.

4. A latex composition comprising a polychloroprene latex and from 1 to 70 parts by mass, per 100 parts by mass of the polychloroprene latex, of an EVA resin emulsion, as main components, wherein the polychloroprene latex contains an alkali salt of resin acid and wherein the EVA resin has an ethylene/vinyl acetate mass ratio of at least 55/45.

5. The latex composition according to claim 1, further comprising an adhesive resin.

6. The latex composition according to claim 1, further comprising a metal oxide.

7. The latex composition according to claim 6, wherein the metal oxide is zinc oxide.

8. A method for bonding a porous polymer material and a cloth, comprising utilizing the latex composition as defined in claim 1 as an adhesive.

9. A laminate formed by bonding a porous polymer material and a cloth with the latex composition as defined in claim 1.

10. A water base primer obtained by adjusting the solid content of the latex composition as defined in claim 1 in a range of at most 40 wt %.

11. A bonding method for bonding an adherend comprising applying to the adherend the water base primer as defined in claim 10.

12. The latex composition according to claim 2, wherein the polychloroprene latex is prepared by polymerizing 100 parts by mass of chloroprene and from 0.1 to 10 parts by mass of an ethylenically unsaturated carboxylic acid in the presence of from 0.5 to 10 parts by mass of polyvinyl alcohol and then, adding a pH adjusting agent to adjust the pH of the latex to from 6 to 10.

13. A latex composition comprising a polychloroprene latex and from 0.5 to 50 parts by mass, as calculated as solid content per 100 parts by mass of the solid content of the polychloroprene latex, of an EVA resin emulsion, as main components, wherein the polychloroprene latex contains an alkali salt of resin acid and wherein the EVA resin has an ethylene/vinyl acetate mass ratio of at least 55/45.

14. The latex composition according to claim 2, further comprising an adhesive resin.

15. The latex composition according to claim 2, further comprising a metal oxide.

16. The latex composition according to claim 15, wherein the metal oxide is zinc oxide.

17. A method for bonding a porous polymer material and a cloth, comprising utilizing the latex composition as defined in claim 2 as an adhesive.

18. A laminate formed by bonding a porous polymer material and a cloth with the latex composition as defined in claim 2.

19. A water base primer obtained by adjusting the solid content of the latex composition as defined in claim 2 in a range of at most 40 wt %.

20. A bonding method for bonding an adherend comprising applying to the adherend the water base primer as defined in claim 19.

* * * * *